US008634481B1

(12) United States Patent
Chung et al.

(10) Patent No.: US 8,634,481 B1
(45) Date of Patent: Jan. 21, 2014

(54) FEEDBACK TECHNIQUE FOR WIRELESS SYSTEMS WITH MULTIPLE TRANSMIT AND RECEIVE ANTENNAS

(75) Inventors: Seong-Taek Chung, Moutain View, CA (US); Howard C Huang, New York, NY (US); Angel Lozano, New York, NY (US)

(73) Assignee: Alcatel Lucent, Paris (FR)

( * ) Notice: Subject to any disclaimer, the term of this patent is extended or adjusted under 35 U.S.C. 154(b) by 2263 days.

(21) Appl. No.: 09/714,084

(22) Filed: Nov. 16, 2000

(51) Int. Cl.
*H04L 27/00* (2006.01)

(52) U.S. Cl.
USPC ........... 375/259; 375/267; 375/260; 375/299; 370/341; 370/342; 370/362; 370/210; 455/78; 455/272

(58) Field of Classification Search
USPC ................. 340/33 S; 375/259, 267, 295, 260, 375/240.03, 206; 370/442, 342, 332, 206, 370/335, 341; 455/69
See application file for complete search history.

(56) References Cited

U.S. PATENT DOCUMENTS

| | | | | |
|---|---|---|---|---|
| 5,842,113 A * | 11/1998 | Nanda et al. | ..................... | 455/69 |
| 6,084,919 A | 7/2000 | Kleider et al. | ................. | 375/285 |
| 6,115,427 A * | 9/2000 | Calderbank et al. | .......... | 375/267 |
| 6,175,550 B1 * | 1/2001 | van Nee | ......................... | 370/206 |
| 6,333,926 B1 * | 12/2001 | Van Heeswyk et al. | ....... | 370/335 |
| 6,351,499 B1 * | 2/2002 | Paulraj et al. | ................. | 375/267 |
| 6,473,467 B1 * | 10/2002 | Wallace et al. | ................ | 375/267 |
| 6,493,331 B1 * | 12/2002 | Walton et al. | ................. | 370/341 |
| 6,532,262 B1 * | 3/2003 | Fukuda et al. | ........... | 375/240.03 |
| 6,937,592 B1 * | 8/2005 | Heath et al. | .................... | 370/342 |
| 2002/0105961 A1 * | 8/2002 | Hottinen et al. | .............. | 370/442 |

FOREIGN PATENT DOCUMENTS

WO         00 13362 A    3/2000  ............... H04L 1/00

OTHER PUBLICATIONS

Kousa, M A, et al: "Multichannel Adaptive System", IEE Proceedings I. Solid State and Electron Devices, Institution of Electrical Engineers, Stevenage, GB, vol. 140, No. 5, Part 1, Oct. 1, 1993, pp. 357-364.
Knopp, R., et al.,: "Power Control Schemes for TDD Systems with Multiple Transmit and Receive Antennas", Global Telecommunications Conference, 1999, pp. 2326-2330, XP010373369.

* cited by examiner

*Primary Examiner* — Eva Puente
(74) *Attorney, Agent, or Firm* — E. J. Rosenthal

(57) ABSTRACT

In a wireless communication system using multiple antennas at the transmitter and multiple antennas at the receiver, a so called multiple-input multiple-output (MIMO) system, a substantial improvement in capacity over the case of no feedback can be achieved using considerably less bandwidth than is required to feedback the channel estimate or channel statistics, by supplying as feedback for each data substream of an overall data stream an indicator of a rate and/or an indicator of a gain for transmission of that data substream. The indicator of the rate and/or the indicator of the gain may be the rate and/or gain directly or an encoded representation of the rate and/or gain. Typically, the best performance is achieved if indicators of both the rate and the gain are fed back. If the invention is implemented for wireless systems, then typically for each data substream there is a separate, independent antenna. The rate and the gain are computed as a function of a channel estimate which is developed at the receiver. Advantageously, the transmitter may employ only one-dimensional data coding for each of the data substreams.

28 Claims, 2 Drawing Sheets

US 8,634,481 B1

FEEDBACK TECHNIQUE FOR WIRELESS SYSTEMS WITH MULTIPLE TRANSMIT AND RECEIVE ANTENNAS

TECHNICAL FIELD

This invention relates to the art of wireless communications, and more particularly, to wireless communication systems using multiple antennas at the transmitter and multiple antennas at the receiver, so called multiple-input multiple-output (MIMO) systems.

BACKGROUND OF THE INVENTION

It is known in the art that multiple-input multiple-output (MIMO) systems can achieve dramatically improved capacity as compared to single antenna, i.e., single antenna to single antenna or multiple antenna to single antenna, systems. It is also known in the art that if a channel estimate or channel statistics based on the channel estimate are fed back to the transmitter, then the throughput of the channel can be improved with respect to an identically configured system but without feedback. However, because in MIMO systems the overall channel is actually made up of multiple channels, with one channel for each transmit and receive pairing, such feedback requires considerable bandwidth, and it is undesirable to dedicate so much bandwidth to feedback.

SUMMARY OF THE INVENTION

In a MIMO system, a substantial improvement over the case of no feedback can be achieved using considerably less bandwidth than is required to feedback the channel estimate or channel statistics, in accordance with the principles of the invention, by supplying as feedback for each data substream of an overall data stream an indicator of a rate and/or an indicator of a gain for transmission of that data substream. The indicator of the rate and/or the indicator of the gain may be the rate and/or gain directly or an encoded representation of the rate and/or gain. Typically, the best performance is achieved if indicators of both the rate and the gain are fed back. If the invention is implemented for wireless systems, then typically for each data substream there is a separate, independent antenna. The rate and the gain are computed as a function of a channel estimate which is developed at the receiver. Advantageously, the transmitter may employ only one-dimensional data coding for each of the data substreams.

DETAILED DESCRIPTION

Figure 1:
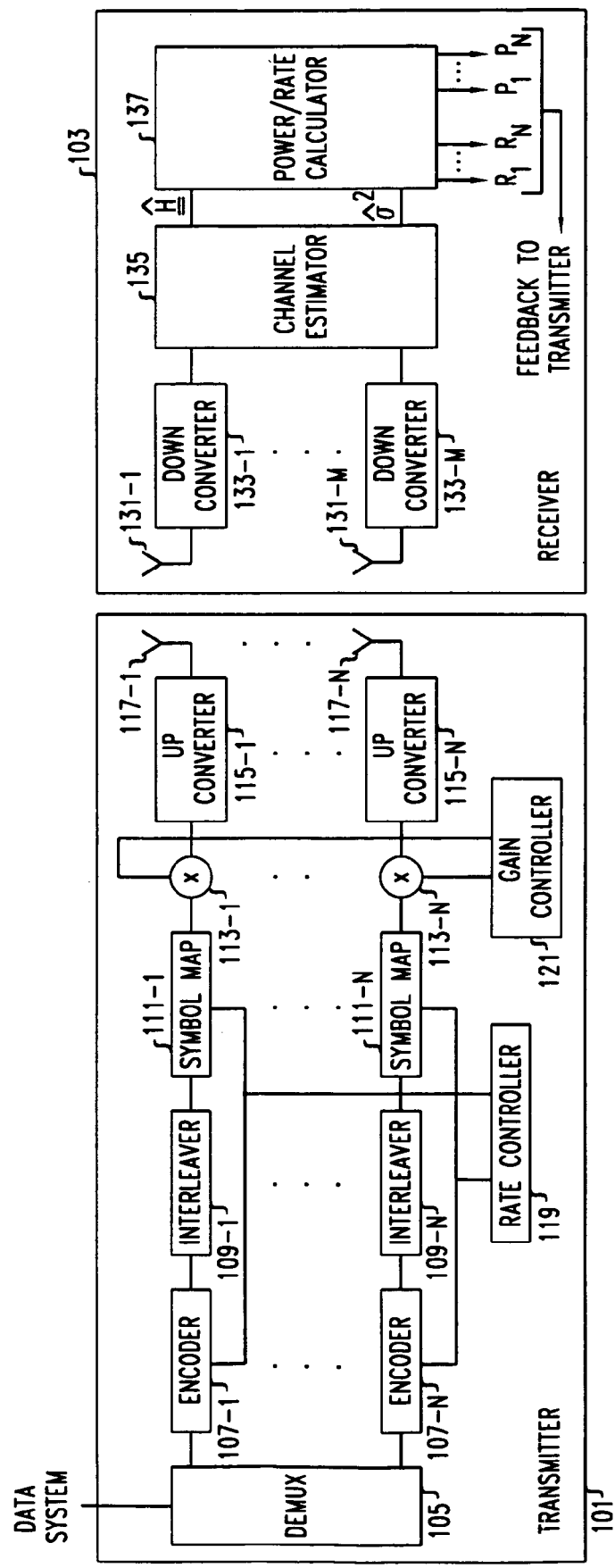
FIG. 1 shows an exemplary multiple-input multiple-output (MIMO) system arranged in accordance with the principles of the invention so as to achieve dramatically improved capacity as compared to single antenna systems.

The following merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

The functions of the various elements shown in the FIGs., including functional blocks labeled as "processors" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementor as more specifically understood from the context.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein.

FIG. 1 shows an exemplary multiple-input multiple-output (MIMO) system arranged in accordance with the principles of the invention so as to achieve dramatically improved capacity as compared to single antenna systems. In particular, FIG. 1 shows transmitter 101 and receiver 103. Transmitter 101 includes a) demultiplexer (demux) 105; b) encoders 107, including encoders 107-1 through 107-N; c) interleavers 109, including interleavers 109-1 through 109-N; d) symbol mappers 111, including symbol mappers 111-1 through 111-N; e) gain multipliers 113, including gain multipliers 113-1 through 113-N; f) optional upconverters 115, including optional upconverters 115-1 through 115-N; g) optional transmit antennas 117, including optional transmit antennas 117-1 through 117-N; h) rate controller 119; and i) gain controller 121. Receiver 103 includes a) optional receive antennas 131, including optional receive antennas 131-1 through 131-M; b) optional downconverters 133, including optional downconverters 133-1 through 133-M; c) channel estimator 135; and d) power/rate calculator 137.

Demultiplexer 105 receives as an input an overall data stream, which is the data to be transmitted, and divides it into N data substreams, each to be processed along an independent transmit path and then transmitted.

Each of encoders 107 applies channel coding to the respective data substream it receives so as to increase the redundancy of the data substream. This facilitates error recovery at the receiver should errors occur. In accordance with an aspect of the invention, the type of channel coding used is a function of the rate, or an indicator thereof, that is fed back from the receiver. This function may be implemented using a lookup table given an indicator of the rate that is fed back, and is typically implemented by rate controller 119. Those of ordinary skill in the art will readily appreciate how to arrange such a function given the particular details of the system being implemented, e.g., the channel statistics, the number of substreams employed, and the like. The type of channel coding employed determines the particular amount of redundancy in the encoded data substream, and it is noted that the amount of redundancy is known as the code rate. Each of encoders 107 may use a channel coding that is independent of the channel coding used by any other of encoders 107, and each may receive an independently specified rate.

Interleavers 109 are conventional in nature and each rearranges the bits of the encoded data substream it receives to provide protection against channel fades.

Each of symbol mappers 111 maps the bits of the interleaved encoded channel substream that it receives to a point in a constellation. In accordance with an aspect of the invention, the particular constellation employed is selected as a function of the rate, or an indicator thereof, that is fed back from the receiver. This function may be implemented using a lookup table given an indicator of the rate that is fed back, and is typically implemented by rate controller 119. Those of ordinary skill in the art will readily appreciate how to arrange such a function given the particular details of the system being implemented, e.g., the channel statistics, the number of substreams employed, and the like. Typically, the lower the rate of data transmission the lower the number of symbols in the constellation for transmitting data at that rate.

In accordance with an aspect of the invention, each of gain multipliers 113 applies to the mapped data substream that it receives the gain that was indicated in the feedback from the receiver. In an exemplary embodiment of the invention, the better the particular channel that corresponds to one of gain multipliers 113 the greater the gain that is applied, e.g., in accordance with the principles of waterfilling.

Each of optional upconverters 115 performs conventional upconverting functionality. In the case of a radio-based system each of upconverters 115 generates a radio frequency signal by modulating a carrier waveform using the gain regulated mapped data substream it receives as an input. Each resulting modulated signal may be supplied to the respective one of optional transmit antennas 117 that may be coupled to each of upconverters 115.

Rate controller 119 receives the rates, or indicators thereof, via feedback from receiver 103 and derives from the received information the code rate and the constellation size for each substream. Each code rate, or an indicator thereof, is then supplied to the appropriate encoder and the constellation to employ, or an indicator thereof, is supplied to each symbol mapper, in accordance with an aspect of the invention. Thus, rate controller 119 may implement a mapping function to determine the code rate and constellation from the information fed back from receiver 103.

Gain controller 121 receives the gains, or indicators thereof, via feedback from receiver 103 and derives from the received information the gain to be used for each substream by the associated one of gain multipliers 113. Note that there is a direct relationship between power and gain. More specifically, power is converted to gain by taking the square root of the power. Thus, power may be an indicator for gain, and vice-versa. If power information is received via feedback, it may easily be converted into the appropriate gain.

Note that the functionality of rate controller 119 may be incorporated into encoders 107 and symbol mappers 111. Similarly, the functionality of gain controller 121 may be incorporated into gain multipliers 113.

Each of optional receive antennas 131 receives a signal from each of optional transmit antennas 117. The signals received at each antenna are converted to baseband by the one of optional downconverters 133 to which it is coupled. The resulting baseband signals are fed into channel estimator 135.

Channel estimator 135 develops an estimate of the channels for each transmit and receive pair. Thus, for N transmit antennas and M receive antennas there are N×M channels. The estimates for each of the channels are collectively arranged into an N×M matrix of the overall channel estimate $\hat{H}$. Additionally, channel estimator 135 develops an estimate of the noise power in the channel, $\hat{\sigma}^2$.

$\hat{H}$ and $\hat{\sigma}^2$ are supplied to power/rate calculator 137 which, in accordance with the principles of the invention, calculates the rates R and powers P—which, as noted above, correspond directly to gains and are used by transmitter 101 in the form of gains—or indicators thereof, that transmitter 101 should use for each data substream produced by demultiplexer 105. The rates and powers are supplied to transmitter 101 using a feedback channel.

The processes by which rates and powers are assigned by power/rate calculator 137 is up to the implementor. Those of ordinary skill in the art will be able to develop their own processes given the discussion and examples hereinbelow. In particular, the goal of the process is to assign rates and powers to maximize the total channel capacity. Toward this end, typically, those channels that are of a better quality will be assigned higher rates and greater power.

Note that receiver 103 does not show a decoder and a deinterleaver. This is because, although a decoder and a deinterleaver are necessary for a complete receiver—to reverse the complementary functions performed in the transmitter prior to supplying data as an output of receiver 103—they are not required for the data streams that are supplied to channel estimator 135, and so that are not shown for the sake of clarity of exposition.

Figure 2:
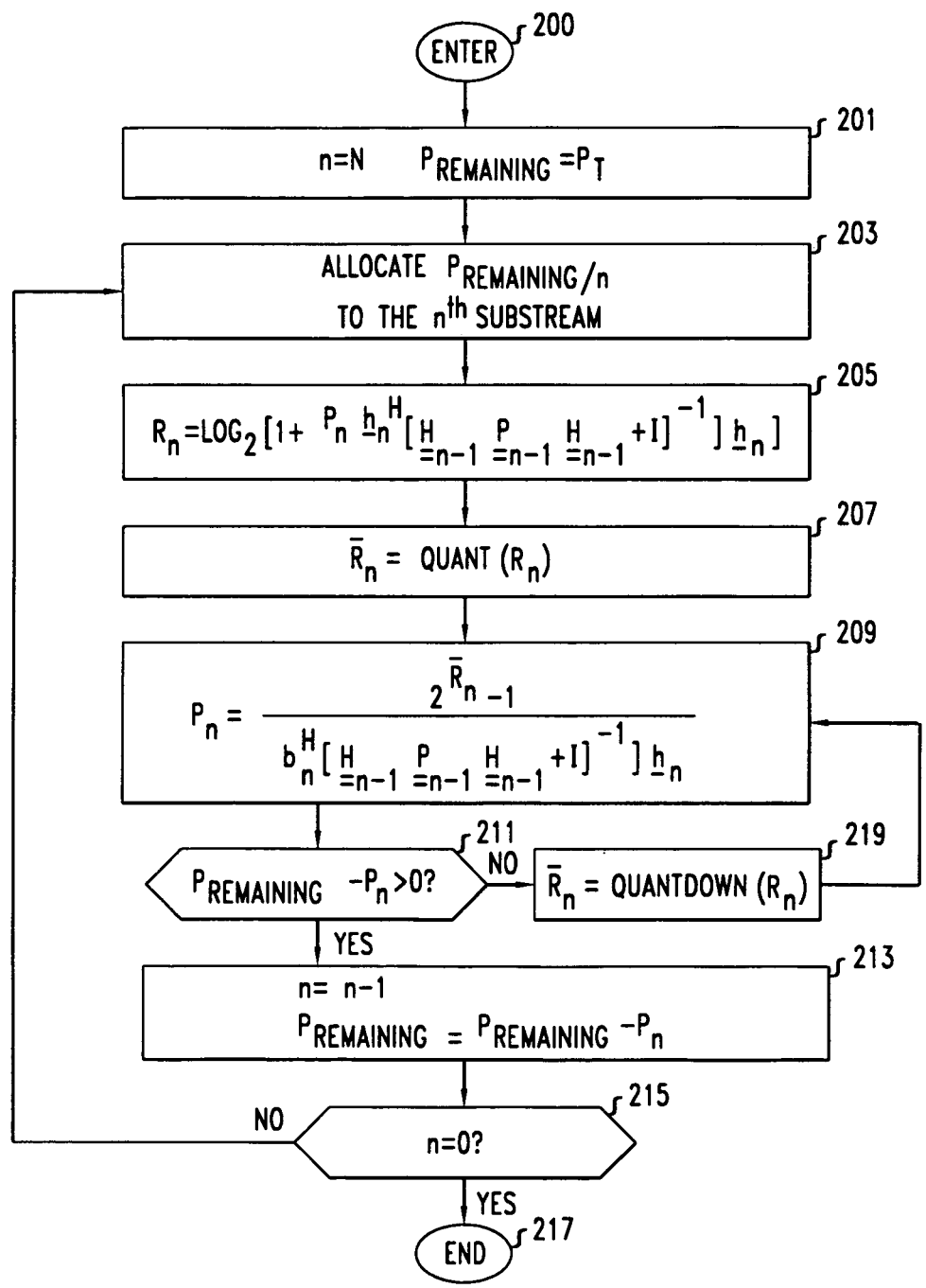
FIG. 2 shows an exemplary process for determining rates and powers for a system with N transmit substreams and M receive branches, in accordance with an aspect of the invention.

FIG. 2 shows an exemplary process for determining rates and powers for a system with N transmit substreams and M receive branches, in accordance with an aspect of the invention. In one embodiment of the invention, the process of FIG. 2 may be constantly running. However, the values determined by the process are only fed back when there is a significant deviation from the values that were previously fed back. In another embodiment of the invention, the process may begin to run only when channel estimator 135 (FIG. 1) determines that the channel has changed by an amount sufficient to warrant the running of the process. For example, when the norm of the difference of $\hat{H}$ at the last time rates and powers were determined and $\hat{H}$ at the current time is greater than a prescribed threshold. The process of FIG. 2 is performed by power/rate calculator 137 (FIG. 1)

The process is entered in step 200 (FIG. 2) when it is determined that the rates and powers are to be computed. In step 201 several variables are initialized. In particular, a counter, n, is initialized to the value of N and the value of variable $P_{remaining}$ is initialized to $P_T$, which is the total transmit power available in the system in which the process of FIG. 2 is being employed. Next, in step 203, an initial power allocation of $P_{remaining}/n$, denoted as $P_n$, is assigned to the $n^{th}$ substream. The value of $R_n = \log_2(1 + P_n h_n^H (H_{n+1:N} P_{n+1:N} H_{n+1:N}^H + I)^{-1} h_n)$ (n=1, K, N) is calculated in step 205, where $h_n = [h_{1,n} \ldots h_{M,n}]^T$ is the complex M-dimensional vector for the $n^{th}$ transmit substream;

$h_{m,n}$ is the complex channel coefficient from the $n^{th}$ transmit substream to the $m^{th}$ receive branch, with m=1 . . . M;

superscript T indicates the matrix transpose operation;

$H_{n+1:N} = [h_{n+1} \ldots h_N]$ is an M-by-(N−n) matrix;

$P_{n+1:N} = \text{diag}(P_{n+1} \ldots P_N)$ is the diagonal (N−m) matrix of assigned powers;

superscript H indicates the Hermitian transpose operation;

superscript −1 denotes the matrix inverse; and

I is the identity matrix of size M×M.

In step 207, the value of $R_n$ is quantized to the nearest step size, e.g., the nearest integer, the nearest integer which is a multiple of a selected integer, or the nearest multiple of a selected value, or the like. The quantized value of $R_n$ is denoted as $\overline{R}_n$.

The power of the current substream n is recalculated in step 209. This may be performed by calculating $$\overline{P}_n = \frac{2^{\overline{R}_n} - 1}{h_n^H (H_{n+1:N} P_{n+1:N} H_{n+1:N}^H + I)^{-1} h_n},$$

where $\overline{P}_n$ indicates a recalculated power. Conditional branch point 211 tests to determine if $P_{remaining} - \overline{P}_n > 0$. This test determines if the amount of power remaining is greater than the amount of power that is allocated for substream n, i.e., the power allocation can actually be performed since there is enough power remaining to support it. If the test result in step 211 is YES, indicating that the power allocation can actually be performed, control passes to step 213, in which the counter n is decremented and $P_{remaining}$ is set to $P_{remaining} - \overline{P}_n$.

Conditional branch point 215 tests to determine if n=0, i.e., have all the substreams been processed. If the test result in step 215 is NO, control passes back to step 203 and the process continues as described above. If the test result in step 215 is YES, control passes to step 217 and the process exits.

If the test result in step 211 is NO, indicating that the power allocation cannot actually be performed, control passes to step 219 in which $\overline{R}_n$ is set equal to value of $R_n$ quantized down to the nearest step size value that is less than $R_n$, e.g., the nearest integer lower than $R_n$, the nearest integer which is a multiple of a selected integer and is lower than $R_n$, or the nearest multiple of a selected value and is lower than $R_n$, or the like. This will result in a lower value of $\overline{P}_n$. Control then passes back to step 209 and the process continues as described above.

Once the process of FIG. 2 has completed the rates and powers that were generated may be supplied via a feedback path for use in a transmitter. Alternatively, the rates and powers may be encoded so that they are represented by indicators which may be interpreted by the transmitter to determine the appropriate rates and powers—and hence gains. Also, as noted above, the powers may be converted into gains in the receiver, and the gain information directly, or encoded representations thereof, may be supplied via the feedback path for use in the transmitter. Furthermore, in accordance with an aspect of the invention, only information about the rates, or only information about the powers—and hence gains—may be fed back to achieve an improvement over the prior art, although feeding back both results in better performance.

What is claimed is:

1. A transmitter of a multiple-input multiple-output (MIMO) system comprising:
    means for developing a rate and a power for each data substream, said means for developing being adapted to develop each said rate and each said power based on feedback of an indicator of each said rate and each said power received from a receiver of said MIMO system; and
    means for applying to each respective data substream a rate control and a power control corresponding to said rate and power that was developed for said data substream, wherein, from time to time, said rate developed for and applied to one of said data substreams is different from said rate developed for and contemporaneously applied to at least one other of said data substreams;
    wherein said indicator of each said rate and of each said power for each data substream was derived based on received versions of signals previously transmitted from said transmitter, said received versions having been received at said receiver and being such that each said output received a signal from each said input.

2. The transmitter as defined in claim 1 wherein each said rate and each said power for each of said substreams are separately represented in said feedback.

3. The transmitter as defined in claim 1 wherein each respective rate for each of said substreams is the value of each said respective indicator of said rate and each said respective power for each of said substreams is the value of each said respective indicator of said power.

4. The transmitter as defined in claim 1 wherein each said rate and each said power is a value determined as a function of said received indicator of said rate and said power.

5. The transmitter as defined in claim 1 wherein said indicator of said rate and power for each data substream is a function of channel estimates determined at said receiver.

6. The transmitter as defined in claim 1 further comprising:
    a plurality of encoders, one of said encoders being respectively associated with each of said data substreams, each of said encoders being responsive to said developed rate for its associated data substream; and
    a plurality of symbol mappers, each of said symbol mappers coupled to receive a respective encoded version of one of said data substreams, and each of said symbol mappers also being responsive to said rate of its associated data substream.

7. The transmitter as defined in claim 6 further comprising a plurality of gain multipliers each of which is responsive to said power received for a respective one of said data substreams as part of said feedback from said receiver.

8. The transmitter as defined in claim 6 further comprising a plurality of interleavers, each respective one of said interleavers being coupled between a respective one of said encoders and a respective one of said symbol mappers.

9. The transmitter as defined in claim 6 wherein each of said symbol mappers is associated with a respective one of said encoders for a respective one of said data substreams.

10. The transmitter as defined in claim 6 wherein each of said symbol mappers is associated with a respective one of said encoders along a transmit path for a respective one of said data substreams, and for each transmit path its associated encoder and symbol mapper receive the same rate.

11. The transmitter as defined in claim 6 further comprising a rate controller for supplying said rate developed for each data substream to respective ones of each of said symbol mappers and respective ones of each of said encoders.

12. The transmitter as defined in claim 1 further comprising:
a plurality of gain appliers, one gain applier for each of said data substreams, each of said gain appliers being responsive to a respective power developed for each data substream.

13. The transmitter as defined in claim 12 wherein said gain applier is a multiplier.

14. The transmitter as defined in claim 12 further comprising a gain controller for supplying to each of said gain appliers a power to be used.

15. A receiver of a multiple-input multiple-output (MIMO) system for receiving a plurality of data substreams derived from an overall data stream over a plurality of channels such that each said output receives a signal from each said input, the receiver comprising:
means for estimating channel characteristics; and
a calculator, responsive to channel characteristic estimates from said means for estimating channel characteristics, for calculating at least one indicator of at least one of the set consisting of a rate and a power for each respective one of said substreams, said indicator to be used by a transmitter of said substreams for setting at least one of the set consisting of (1) a rate and (2) a power;
wherein, from time to time, at least one indicator of a rate for a particular substream of said substreams is different from an indicator of a rate developed for and to be contemporaneously used for another of said substreams.

16. The invention as defined in claim 15 further comprising:
means for transmitting said indicator for each respective one of said substreams as feedback to said transmitter.

17. A method for use in processing for transmission, over a plurality of channels such that each said output receives a signal from each said input in a multiple-input multiple-output (MIMO) system, a plurality of data substreams derived from an overall data stream, the method comprising the steps of:
encoding each of said data substreams as a function of each indicator of a respective rate received as feedback from a receiver of said MIMO system for each of said data substreams to produce encoded data substreams, wherein, from time to time, at least one respective rate is not identical to at least one other contemporaneously used respective rate; and
mapping each of said encoded data substreams after they are each respectively interleaved, said mapping for each of said encoded interleaved data stream being performed using a constellation selected as a function of each of said indicators of said respective rates received as feedback from a receiver of said MIMO system for each of said data substreams to produce encoded interleaved mapped data substreams.

18. The method as defined in claim 17 further comprising the step of controlling the power of each of said encoded interleaved mapped data substreams as a function of respective indicators received as feedback from said receiver of said MIMO system for power control of each of said encoded interleaved mapped data substreams.

19. The method as defined in claim 18 wherein there are N transmit paths, one for each data substream and M receive paths, so that there are N×M channels, said indicators and said rates are developed in said receiver by the steps of:
developing overall channel estimate $\hat{H}$, which is an N×M matrix;
determine a noise power in the channel, $\hat{\sigma}^2$;
initializing counter n to the value of N;
initializing variable $P_{remaining}$ to the total transmit power available in the system $P_{(Previously\ presented)}$ $T$;
assigning an initial power allocation of the $n^{th}$ substream $P_n$ to a value of $P_{remaining}/n$;
computing $R_n = \log_2(1 + P_n h_n^H (H_{n+1:N} P_{n+1:N} H_{n+1:N}^H + I)^{-1} h_n)$ (n=1, ..., N) where
$R_n$ is a rate to use for the for the $n^{th}$ transmit substream;
$h_n = [h_{1,n} \ldots h_{M,n}]^T$ is the complex M-dimensional vector for the $n^{th}$ transmit substream;
$h_{m,n}$ is the complex channel coefficient from the $n^{th}$ transmit substream to the $m^{th}$ receive branch, with m=1 ... M;
superscript (Previously presented) T indicates the matrix transpose operation;
$H_{n+1:N} = [h_{n+1} \ldots h_N]$ is an M-by-(N−n) matrix;
$P_{n+1:N} = \text{diag}(P_{n+1} \ldots P_N)$ is the diagonal (N−m) matrix of assigned powers;
superscript H indicates the Hermitian transpose operation;
superscript −1 denotes the matrix inverse; and
I is the identity matrix of size M×M;
quantizing $R_n$ to the nearest step size to develop $\bar{R}_n$; and
recalculating the power of current substream n by calculating $$\bar{P}_n = \frac{2^{\bar{R}_n} - 1}{h_n^H (H_{n+1:N} P_{n+1:N} H_{n+1:N}^H + I)^{-1} h_n},$$

where $\bar{P}_n$ indicates a recalculated power.

20. The method as defined in claim 18 further comprising the following steps when $P_{remaining} - \bar{P}_n > 0$
decrementing n;
setting $P_{remaining}$ to $P_{remaining} - \bar{P}_n$; and
when n is not equal to zero, repeating said assigning, computing, quantizing, and recalculating steps.

21. The method as defined in claim 18 further comprising the following steps when $P_{remaining} - \bar{P}_n < 0$
setting $\bar{R}_n$ equal to value of $\bar{R}_n$ quantized down to the nearest step size value that is less than $R_n$; and
repeating said recalculating step.

22. A method for use in a receiver of a multiple-input multiple-output (MIMO) system, in which there are N transmit paths, one for each data substream to be transmitted and M receive paths, so that there are N×M coupled channels in an overall channel, the method comprising the steps of:
developing overall channel estimate $\hat{H}$, which is an N×M matrix;
determine a noise power in the channel, $\hat{\sigma}^2$;
initializing counter n to the value of N;
initializing variable $P_{remaining}$ to the total transmit power available in the system $P_{(Previously\ presented)}$ $T$;
assigning an initial power allocation of the $n^{th}$ substream $P_n$ to a value of $P_{remaining}/n$;
computing $R_n = \log_2(1 + P_n h_n^H (H_{n+1:N} P_{n+1:N} H_{n+1:N}^H + I)^{-1} h_n)$ (n=1, N) where $R_n$ is a rate to use for the for the $n^{th}$ transmit substream;
$h_n=[h_{1,n} \ldots h_{M,n}]^T$ is the complex M-dimensional vector for the $n^{th}$ transmit substream;
$h_{m,n}$ is the complex channel coefficient from the $n^{th}$ transmit substream to the $m^{th}$ receive branch, with $m=1 \ldots M$;
superscript (Previously presented) T indicates the matrix transpose operation;
$H_{n+1:N}=[h_{n+1} \ldots h_N]$ is an M-by-(N−n) matrix;
$P_{n+1:N}=\text{diag}(P_{n+1} \ldots P_N)$ is the diagonal (N−m) matrix of assigned powers;
superscript H indicates the Hermitian transpose operation;
superscript −1 denotes the matrix inverse; and
I is the identity matrix of size M×M;
quantizing $R_n$ to the nearest step size to develop $\overline{R}_n$; and
recalculating the power of current substream n by calculating $$\overline{P}_n = \frac{2^{\overline{R}_n}-1}{h_n^H(H_{n+1:N}P_{n+1:N}H_{n+1:N}^H+I)^{-1}h_n},$$

where $\overline{P}_n$ indicates a recalculated power.

23. The method as defined in claim 22 further comprising the following steps when $P_{remaining}-\overline{P}_n>0$
decrementing n;
setting $P_{remaining}$ to $P_{remaining}-\overline{P}_n$; and
when n is not equal to zero, repeating said assigning, computing, quantizing, and recalculating steps.

24. The method as defined in claim 22 further comprising the following steps when $P_{remaining}-\overline{P}_n<0$
setting $\overline{R}_n$ equal to value of $R_n$ quantized down to the nearest step size value that is less than $R_n$; and
repeating said recalculating step.

25. A transmitter of a multiple-input multiple-output (MIMO) system comprising:
means for developing a rate and a power for each data substream, said means for developing being adapted to develop each said rate and each said power based on feedback of an indicator of each said rate and each said power received from a receiver of said MIMO system; and
means for applying to each respective data substream a rate control and a power control corresponding to said rate and power that was developed for said respective data substream, wherein, from time to time, said power developed for and applied to one of said data substreams is different from said power developed for and contemporaneously applied to at least one other of said data substreams;
wherein said indicator of each said rate and of each said power for each data substream was derived based on received versions of signals previously transmitted from said transmitter, said received versions having been received at said receiver and being such that each said output received a signal from each said input.

26. The method as defined in claim 1 wherein, from time to time, at least one of said powers for one of said substreams is actually different from at least one other of said contemporaneously used powers for another of said substreams.

27. The method as defined in claim 25 wherein, from time to time, at least one of said rates for one of said substreams is actually different from at least one other of said contemporaneously used rates for another of said substreams.

28. A receiver of a multiple-input multiple-output (MIMO) system for receiving a plurality of data substreams derived from an overall data stream over a plurality of channels such that each said output receives a signal from each said input, the receiver comprising:
means for estimating channel characteristics; and
a calculator, responsive to channel characteristics estimates from said means for estimating channel characteristics, for calculating at least one indicator of at least one of the set consisting of a rate and a power for each respective one of said substreams, said indicator to be used by a transmitter of said substreams for setting at least one of the set consisting of (1) a rate and (2) a power;
wherein, from time to time, at least one indicator of a power for a particular substream of said substreams is different from an indicator of a power developed for and to be contemporaneously used for another of said substreams.

* * * * *